US012794560B2

(12) United States Patent
Zhang et al.

(10) Patent No.: US 12,794,560 B2
(45) Date of Patent: Nov. 10, 2026

(54) OPTICAL MODULE

(71) Applicants: PROSE TECHNOLOGIES (SUZHOU) CO., LTD., Suzhou (CN); PROSE TECHNOLOGIES LLC, Mount Olive, NJ (US)

(72) Inventors: Deping Zhang, Suzhou (CN); Tuo Xu, Suzhou (CN); Xiu Liu, Suzhou (CN)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 225 days.

(21) Appl. No.: 18/663,066

(22) Filed: May 14, 2024

(65) Prior Publication Data

US 2024/0305377 A1 Sep. 12, 2024

Related U.S. Application Data

(63) Continuation of application No. PCT/CN2022/106386, filed on Jul. 19, 2022.

(30) Foreign Application Priority Data

Dec. 7, 2021 (CN) ......................... 202111484232.5

(51) Int. Cl.
*H04B 10/40* (2013.01)
*H04B 10/079* (2013.01)

(52) U.S. Cl.
CPC ....... *H04B 10/40* (2013.01); *H04B 10/07955* (2013.01); *H04B 2210/006* (2013.01)

(58) Field of Classification Search
CPC .... C12N 2310/20; C12N 9/1276; C12N 9/22; C12N 15/113; C12N 15/907; C12N 15/11;

(Continued)

(56) References Cited

U.S. PATENT DOCUMENTS 4,750,889 A * 6/1988 Ignasiak .............. H01R 12/716 228/180.1
6,563,696 B1 * 5/2003 Harris ..................... H05K 3/325 174/16.3

(Continued)

FOREIGN PATENT DOCUMENTS

AU 2010210771 B2 * 9/2015 ....... H04B 10/25754
CN 2595089 Y * 12/2003

(Continued)

OTHER PUBLICATIONS

Low-Noise WCL Driver (Year: 2015).*

(Continued)

*Primary Examiner* — David C Payne
*Assistant Examiner* — Mohammed Abdelraheem
(74) *Attorney, Agent, or Firm* — ANOVA LAW GROUP, PLLC

(57) ABSTRACT

An optical module includes: one or more optical ports, configured to receive an uplink optical signal or transmit a downlink optical signal; a downlink, configured to apply a downlink radio frequency signal converted by a radio frequency input signal to a photoelectric conversion and transmission unit; a control unit, configured to generate a downlink monitoring modulation signal applied to the photoelectric conversion and transmission unit; the photoelectric conversion and transmission unit, configured to modulate the downlink radio frequency signal and the downlink monitoring modulation signal onto a downlink optical signal, and the downlink optical signal is expanded into downlink split optical signals, and the downlink split optical signals are respectively provided to the one or more optical ports via one or more optical fibers; and an uplink, configured to convert an uplink optical signal into a radio frequency output signal.

11 Claims, 6 Drawing Sheets

(58) Field of Classification Search
CPC .............. C12N 15/88; C12N 2310/315; C12N 2310/321; C12N 2310/3521; C12N 2800/80; C12N 15/102; C07K 2319/80; C12Q 2521/107; C12Q 2521/301; H04B 10/07955; H04B 10/2575; H04B 10/40; H04B 10/506; H04B 10/564; H04B 2210/006
See application file for complete search history.

(56) References Cited

U.S. PATENT DOCUMENTS

| | | | | |
|---|---|---|---|---|
| 9,148,203 | B2 * | 9/2015 | Lemson | H04B 10/25753 |
| 10,230,465 | B1 | 3/2019 | Polehn | |
| 2004/0001719 | A1 | 1/2004 | Sasaki | |

FOREIGN PATENT DOCUMENTS

| | | | | | |
|---|---|---|---|---|---|
| CN | 201018511 | Y | * | 2/2008 | |
| CN | 201365254 | Y | * | 12/2009 | |
| CN | 201533311 | U | * | 7/2010 | |
| CN | 101895337 | A | * | 11/2010 | |
| CN | 102752056 | A | * | 10/2012 | |
| CN | 202617121 | U | * | 12/2012 | |
| CN | 202978956 | U | * | 6/2013 | |
| CN | 102752056 | B | * | 3/2015 | |
| CN | 204290969 | U | * | 4/2015 | |
| CN | 104796974 | A | * | 7/2015 | H04W 52/14 |
| CN | 114024604 | A | | 2/2022 | |
| EP | 3297105 | A1 | * | 3/2018 | H05B 45/48 |

OTHER PUBLICATIONS

GPS-Over-Fiber-For-Small-Cells (Year: 2018).*
AD8307 Data sheet (Year: 2003).*
HUBER+SUHNER RF Over Fiber RFoF1 (Year: 2019).*
Wavelength Electronics LDD M Series (Year: 2003).*
IPC-2221A (Year: 2003).*
IPC-A-610E (Year: 2010).*
ECC Decision (15) 01 (Year: 2015).*
ETSI TS 136143 V12.1.0 (Year: 2015).*
RF Manual 20th Edition (Year: 2017).*
The European Patent Office (EPO) Extended Search Report for EP Application No. 22902821.2 Nov. 11, 2025 11 Pages.
The World Intellectual Property Organization (WIPO) International Search Report for PCT/CN2022/106386 Oct. 10, 2022 6 Pages (including translation).

* cited by examiner

OPTICAL MODULE

RELATED APPLICATIONS

This application is a continuation application of PCT Patent Application No. PCT/CN2022/106386, filed on Jul. 19, 2022, which claims priority to Chinese Patent Application No. 202111484232.5 filed with the National Intellectual Property Administration, People's Republic of China on Dec. 7, 2021, all of which are incorporated herein by reference in entirety.

FIELD OF THE TECHNOLOGY

Embodiments of the present disclosure relate generally to the field of data communications, and specifically to optical modules.

BACKGROUND

Certain existing optical modules, such as analog optical modules, usually support 2G/3G/4G operating frequency bands and do not support multi-network full-band communication system transmission at the same time. For example, it may be difficult for certain existing optical modules to adapt to implementation of the latest 5G communication systems. Even if some optical modules adapt to the implementation of the latest 5G communication systems, in order to improve the dynamic range of the receiver as much as possible, the circuit design used is usually more complex. Certain such existing circuit design of multiple independent photoelectric conversion and optical signal reception, as well as multiple independent optical signal electro-optical conversion and optical signal emission, is of a relatively complex structure and a high manufacturing cost.

Certain existing optical module solutions may not realize desirable dynamic range of the receiver through a relatively low-complexity circuit design.

SUMMARY

An optical module is provided that may obtain desirable dynamic range of a receiver through a relatively low-complexity circuit design.

In one aspect, the present disclosure provides an optical module. The optical module includes: one or more optical ports, each configured to receive an uplink optical signal or transmit a downlink optical signal; a downlink, configured to apply a downlink radio frequency signal converted by a radio frequency input signal to a photoelectric conversion and transmission unit; a control unit, configured to generate a downlink monitoring modulation signal applied to the photoelectric conversion and transmission unit; the photoelectric conversion and transmission unit, configured to modulate the downlink radio frequency signal and the downlink monitoring modulation signal onto a downlink optical signal, and the downlink optical signal is expanded into multiple downlink split optical signals, and the multiple downlink split optical signals are respectively provided to the one or more optical ports via one or more first optical fibers; and an uplink, configured to convert an uplink optical signal into a radio frequency output signal.

In certain embodiment(s), the photoelectric conversion and transmission unit includes: a laser, configured to generate the downlink optical signal; a first optical fiber, configured to transmit the downlink optical signal to an optical splitter, the first optical fiber is coupled between the laser and the optical splitter; the optical splitter, configured to expand the downlink optical signal into multiple downlink split optical signals; and one or more second optical fibers, configured to transmit multiple downlink split optical signals to one or more optical ports, one end of each second optical fiber in the one or more second optical fibers is coupled to the optical splitter.

In certain embodiment(s), the optical module further includes: one or more wavelength division multiplexers, coupled to the one or more optical ports via one or more third optical fibers, the other end of each second optical fiber being coupled to a multiplexer in the one or more wavelength division multiplexers; and one or more third optical fibers, coupled between the one or more wavelength division multiplexers and the one or more optical ports.

In certain embodiment(s), the uplink includes a plurality of uplink branches, each of the plurality of uplink branches includes: a detector, configured to demodulate the uplink optical signal in the uplink branch into an uplink radio frequency signal and an uplink monitoring modulation signal respectively; and a first attenuator, coupled to the detector and is configured to adjust an output signal of the detector so that powers of output signals of each uplink branch matches.

In certain embodiment(s), the optical module further includes: a first optical power detection unit, coupled to the detector of each uplink branch, and is configured to detect an optical power value of the uplink optical signal of each uplink branch respectively, where, the control unit is further configured to receive the detection signal of the first optical power detection unit, to respectively adjust the first attenuator in the corresponding uplink branch based on the detection signal of the first optical power detection unit, so that the power of the output signals of each uplink branch is matched, and the detection signal of the first optical power detection unit indicates an optical power value of the uplink optical signal of each uplink branch.

In certain embodiment(s), the first optical power detection unit further includes: a logarithmic amplifier, to convert an output signal of a photodetector into an output signal with a predetermined slope.

In certain embodiment(s), the uplink further includes: a merging unit, coupled between multiple uplink branches and uplink radio frequency links, for merging multiple radio frequency signals converted through multiple uplink optical signals into one uplink radio frequency signal; an uplink radio frequency link, configured to convert the uplink radio frequency signal into the radio frequency output signal.

In certain embodiment(s), the downlink includes: a downlink radio frequency link, configured to convert the radio frequency input signal into the downlink radio frequency signal applied to the photoelectric conversion and transmission unit, the downlink radio frequency link at least includes: a first high-pass filter, configured to allow the downlink radio frequency signal to pass normally and to suppress passage of the downlink monitoring modulation signal.

In certain embodiment(s), the optical module further includes: a frequency shift keying unit, including: a modem, configured to modulate the downlink monitoring modulation signal; a first low-pass filter, coupled to an input end of the photoelectric conversion and transmission unit, configured to allow the downlink monitoring modulation signal applied to the photoelectric conversion and transmission unit to pass normally, and to suppress passage of the downlink radio frequency signal; a radio frequency switch, coupled between the first low-pass filter and the second low-pass filter, and configured to switch between transmission and reception of the monitoring modulation signal; and the second low-pass filter, configured to allow that the uplink monitoring modulation signal of the uplink radio frequency link be provided to the radio frequency switch, and to suppress passage of the uplink radio frequency signal of the uplink radio frequency link.

In certain embodiment(s), the laser is configured such that a length of a pin of the laser is less than or equal to a predetermined length threshold, and the pin of the laser is soldered to front and back sides of a printed circuit board (e.g., through pads).

In certain embodiment(s), the laser is configured such that a positive electrode of a power supply pin of the laser is connected to the ground, and a negative electrode of the power supply pin is connected to a negative voltage.

In certain embodiment(s), the downlink and the uplink support a frequency range of 690 MHz to 3800 MHZ, and the downlink monitoring modulation signal is modulated to 433/315 MHz.

In certain embodiment(s), the control unit is configured to: obtain uplink optical power detection values, the uplink optical power detection values respectively indicating optical power values of uplink optical signals in the uplink branches; obtain a downlink optical power detection value, the downlink optical power detection value indicating an optical power value of the downlink optical signal output by the laser; compare the uplink optical power detection values and the downlink optical power detection value, to generate adjustment signals based on a comparison result; and to output the adjustment signals to one or more of the first attenuators in at least part of the uplink branch. In some embodiments, the control unit is further configured to make the optical power value of the uplink optical signal of each uplink branch match the optical power value of the downlink optical signal.

What is described in this section is not intended to identify key or important features of the embodiments of the present disclosure, nor is it intended to limit the scope of the present disclosure. Other features of the present disclosure become apparent from the following description.

BRIEF DESCRIPTION OF THE DRAWINGS

The above and other features, advantages and aspects of various embodiments of the present disclosure are more apparent with reference to the following detailed description taken in conjunction with the accompanying drawings. In the accompanying drawings, the same or similar reference numbers represent the same or similar elements.

DETAILED DESCRIPTION

Exemplary embodiments of the present disclosure are described below with reference to the accompanying drawings, in which various details of the embodiments of the present disclosure are included to facilitate understanding and should be considered to be exemplary only. Various changes and modifications can be made to the embodiments described herein without departing from the scope and spirit of the disclosure. Also, descriptions of well-known functions and constructions may be omitted from the following description for brevity.

As used herein, the term “include” and its variations mean an open inclusion, for example, “including but not limited to.” Unless otherwise stated, the term “or” means “and/or”. The term “based on” means “based at least in part on.” The terms “one embodiment” and “an embodiment” mean “at least one embodiment.” The term “another embodiment” means “at least one additional embodiment”. The terms “first,” “second,” or the like may refer to different or the same entity. Other explicit and implicit definitions may be included below.

Certain existing optical module solution may not realize desirable dynamic range of the receiver through a relatively low-complexity circuit design.

Certain embodiment(s) of the present disclosure provides an optical module. In certain embodiment(s), the downlink radio frequency signal and modulation signal from the downlink are modulated onto the generated downlink optical signal through the photoelectric conversion and transmission unit, and are expanded into multiple downlink split optical signals and then provided to one or more optical ports via one or more first optical fibers. In addition, by converting the received multiple uplink optical signals into radio frequency output signals through multiple uplink branches included in the uplink, the optical module of the present disclosure can not only support one-to-many star networking, but also can perform long distance transmission through optical fibers. Moreover, the present disclosure independently performs photoelectric conversion and reception of optical signals through multiple uplink branches, thereby improving the dynamic range of the receiver, enhancing the criticality of the optical fiber distribution system, and reducing the complexity of circuit design and product design costs.

Described in more detail below are certain embodiments in conjunction with the accompanying drawings.

Figure 1:
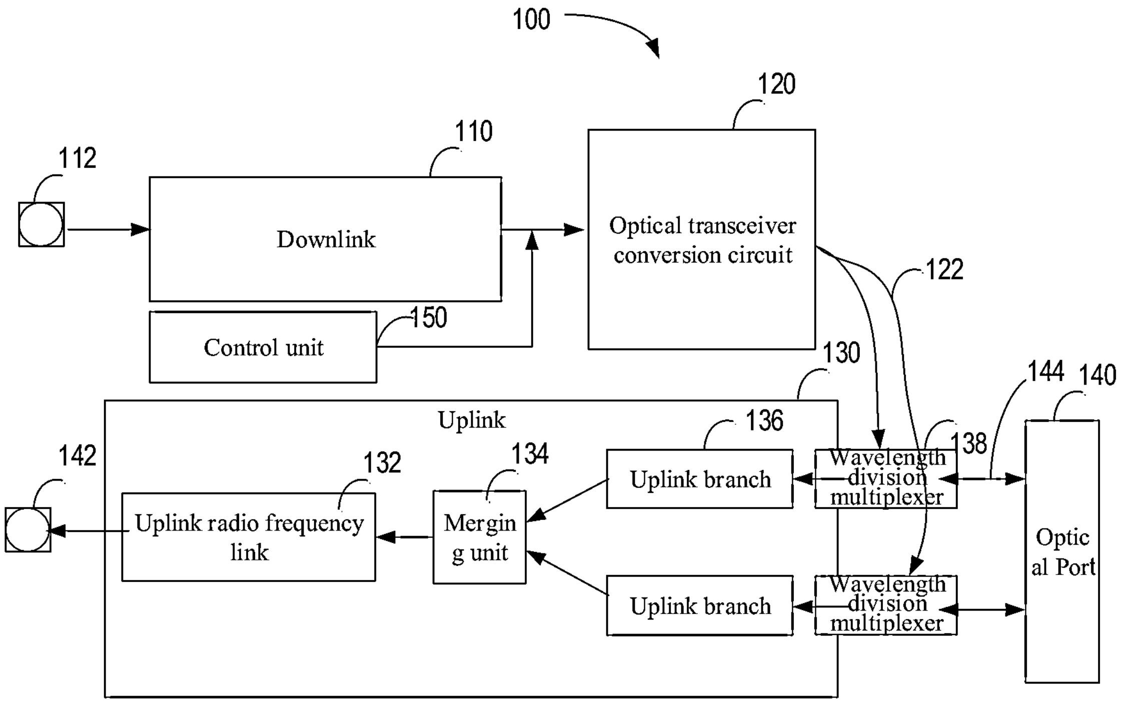
FIG. 1 is a schematic diagram of an optical module according to certain embodiment(s) of the present disclosure.

FIG. 1 illustrates a schematic diagram of an optical module 100 according to certain embodiment(s) of the present disclosure. The optical module 100 is, for example, but not limited to, a high-bandwidth analog optical module. In certain embodiment(s), and as illustratively shown in FIG. 1, the optical module 100 includes a downlink 110, a photoelectric conversion and transmission unit 120, an uplink 130, one or more of optical ports 140, a radio frequency input port 112, a radio frequency output port 142, one or more of wavelength division multiplexers 138, and a control unit 150. In certain embodiment(s), the optical module 100 further includes one or more of second optical fibers 122 and one or more of third optical fibers 144. In certain embodiment(s), the uplink 130 and downlink 110 support the frequency range of 690 MHz~3800 MHz. The design of the radio frequency uplink and downlink and optical transceiver conversion circuits of the present disclosure may achieve high-bandwidth frequency response, thus meeting 3GPP operating frequency band requirements of 2G/3G/4G/5G communication systems, at least in certain embodiment(s).

Regarding the downlink 110, it is configured to apply the downlink radio frequency signal converted via the radio frequency input signal to the photoelectric conversion and transmission unit. As illustratively shown in FIG. 1, the downlink 110 is coupled with the photoelectric conversion and transmission unit 120.

Regarding the control unit 150, it is configured to generate a downlink monitoring modulation signal applied to the photoelectric conversion and transmission unit 120.

Regarding the photoelectric conversion and transmission unit 120, it is configured to modulate the downlink radio frequency signal and the modulation signal onto the generated downlink optical signal. The downlink optical signal is expanded into multiple downlink split optical signals, and the multiple downlink split optical signals are respectively provided to the optical ports via optical fibers. In certain embodiment(s), the photoelectric conversion and transmission unit 120 includes a laser, a first optical fiber, and an optical splitter (not shown in FIG. 1). In certain embodiment(s), the photoelectric conversion and transmission unit 120 further includes a second optical fiber.

The laser is, for example, a semiconductor laser (or "LD laser"). The LD laser is used, for example, to modulate the downlink radio frequency signal and the modulation signal from the downlink 110 onto the downlink optical signal generated by the LD laser.

The optical splitter is configured to expand the downlink optical signal output by the LD laser into multiple downlink split optical signals. The first optical fiber is coupled between the photoelectric conversion and transmission unit and the optical splitter, and is configured to transmit the downlink optical signal output by the LD laser to the optical splitter. In certain embodiment(s), the radio frequency signal and the downlink monitoring modulation signal (for example, the monitoring FSK modulation signal) are loaded onto the laser during downlink, and are transmitted in the optical fiber through the laser. In certain embodiment(s), modulate downlink broadband radio frequency signals are modulated to an optical wavelength of 1550 nm for transmission.

Regarding the second optical fiber 122, it is coupled between the optical splitter and one or more wavelength division multiplexers 138, respectively, for transmitting the multiple downlink split optical signals generated by the laser to one or more optical ports (for example, via wavelength division multiplexer 138 to optical port 140). In certain embodiment(s), the downlink radio frequency signal and the modulation signal from the downlink are modulated onto the generated downlink optical signal through the photoelectric conversion and transmission unit 120, and are expanded into multiple downlink split optical signals and then provided to one or more optical ports via one or more optical fibers. In certain embodiment(s), the optical module of the present disclosure supports one-to-many star networking and/or performs long-distance transmission through optical fibers.

Regarding the uplink 130, it is configured to convert a received uplink optical signals into a radio frequency output signal. In certain embodiment(s), the uplink 130 includes an uplink radio frequency link 132, a merging unit 134, and a plurality of uplink branches 136. In certain embodiment(s), the optical module 100 includes eight or more uplink branches 136. Each uplink 130 includes, for example, a photoelectric conversion and receiving unit for converting the uplink optical signal received through the optical port 140 into an electrical signal. The uplink radio frequency link 132 is configured to convert uplink radio frequency signals into radio frequency output signals. In certain embodiment(s), the uplink optical signal is demodulated into a radio frequency signal through the photodetector tube during uplink. In certain embodiment(s), uplink broadband radio frequency signals are modulated to an optical wavelength of 1310 nm for transmission.

Regarding the merging unit 134, it is coupled between the plurality of uplink branches 136 and the uplink radio frequency link 132, and is used for merging or combining multiple radio frequency signals converted through the multipath uplink optical signals into one uplink radio frequency signal. In certain embodiment(s), through multiple independent uplink branches (for example, multiple independent photoelectric conversion and receiving units), the usefulness of the optical fiber distribution system is appreciated and the dynamic range of the receiver is improved, while reducing the circuit design complexity.

Regarding the optical port 140, it is configured to receive an uplink optical signal or to send out a downlink optical signal. In certain embodiment(s), the optical module 100 includes eight optical ports.

Regarding the wavelength division multiplexer 138, it is coupled between the uplink branch 136 and the optical port 140, and is used for data exchange with the optical ports. The third optical fiber 144 are coupled between the wavelength division multiplexer 138 and the optical port 140 for transmitting the a downlink split optical signal provided to the wavelength division multiplexer 138 to the optical port 140, so that multiple downlink split optical signals are sent out through the optical port 140. The third optical fiber 144 is also configured to provide an uplink optical signal received by the optical port 140 to the wavelength division multiplexer 138, and then to the uplink branch 136 via the wavelength division multiplexer 138. In certain embodiment(s), and by utilizing a wavelength division multiplexer, the optical module realizes the sharing of one optical port for optical signal transmission and optical signal reception, thereby reducing the number of optical ports.

Figure 2:
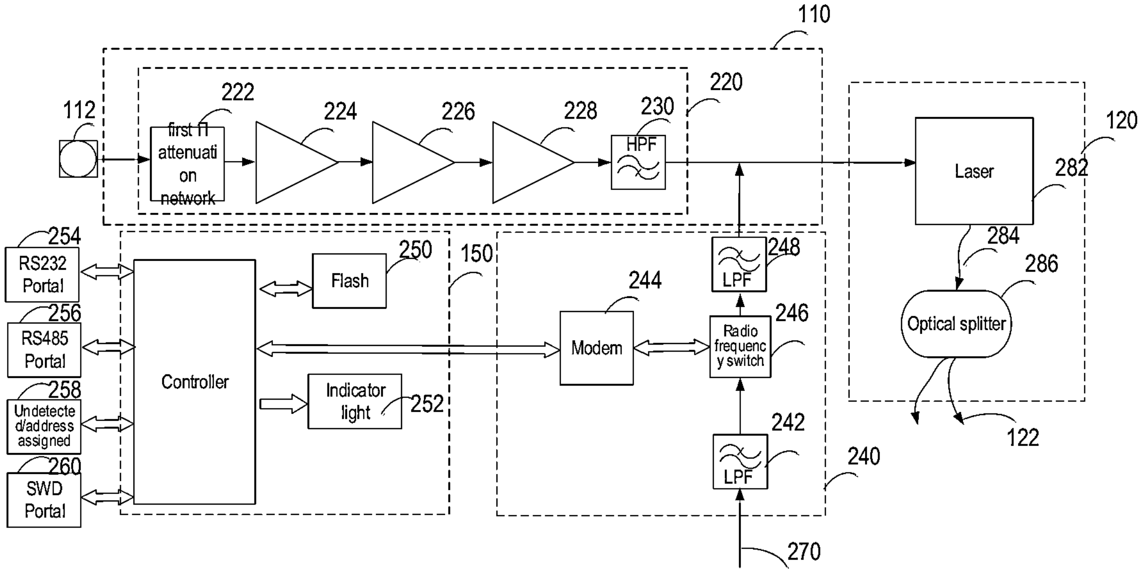
FIG. 2 is a schematic circuit diagram of a downlink and photoelectric conversion transmission unit according to certain embodiment(s) of the present disclosure.

FIG. 2 illustrates a circuit diagram of a downlink, a control unit, and a photoelectric conversion and transmission unit according to certain embodiment(s) of the present disclosure.

In certain embodiment(s), and as illustratively shown in FIG. 2, the downlink 110 includes a downlink radio frequency link 220. The downlink radio frequency link 220 is configured to convert the radio frequency input signal into a downlink radio frequency signal applied to the photoelectric conversion and transmission unit 120. The control unit 150 is at least configured to generate a downlink monitoring modulation signal applied to the photoelectric conversion and transmission unit 120. In certain embodiment(s), a frequency shift keying unit 240 is configured between the control unit 150 and the photoelectric conversion and transmission unit 120. In certain embodiment(s), and as illustratively shown in FIG. 2, the frequency shift keying unit 240 includes: a first low-pass filter 248, a modem (modulation and demodulation device) 244, a radio frequency switch 246, and a second low-pass filter 242.

Regarding the downlink radio frequency link 220, it includes, for example, a first Π attenuation network 222, a first power amplifier 224, a second power amplifier 226, a third power amplifier 228, and a first high-pass filter 230 coupled in sequence. The first Π attenuation network 222 is coupled to the radio frequency input port 112 and is configured to improve the standing wave of the radio frequency input port 112. Some of the first power amplifier 224, the second power amplifier 226 and the third power amplifier 228 may be used for reservation or backup. For example, the first power amplifier 224 and the third power amplifier 228 may be backup power amplifiers. In certain embodiment(s), the downlink radio frequency link 220 includes only the second power amplifier 226. The second power amplifier 226 is used, for example, to reduce noise floor of the downlink radio frequency link 220, for example, to reduce noise figure and to achieve an optimal linear point of the downlink radio frequency link 220. The first high-pass filter 230 is, for example, coupled to the third power amplifier 228, and is configured to allow the downlink radio frequency signal output via the third power amplifier 228 to pass, and/or to suppress the downlink monitoring modulation signal from passing. The output of the first high-pass filter 230 is the downlink radio frequency signal applied to the photoelectric conversion and transmission unit.

Regarding the radio frequency switch 246, it is configured to be coupled between the first low-pass filter 248 and the second low-pass filter 242, and is configured to switch the transmission and reception of the monitoring modulation signal. In certain embodiment(s), the radio frequency switch 246 is, for example and is not limited to, a PE4251 radio frequency switch. Regarding the first low-pass filter 248, it is configured to be coupled to an input end of the photoelectric conversion and transmission unit 120, and is configured to allow the downlink monitoring modulation signal applied to the photoelectric conversion and transmission unit 120 to pass, and/or to suppress the downlink radio frequency signal from passing.

Regarding the second low-pass filter 242, it is configured to allow the uplink monitoring modulation signal 270 of the uplink radio frequency link to be provided to the radio frequency switch 246, and/or to suppress the passage of the uplink radio frequency signal of the uplink radio frequency link.

Regarding the control unit 150, it is configured to generate a monitoring signal via a control program of software loaded thereon based on the received monitoring data signal, and to output the generated monitoring signal to the modem 244. Control unit 150 is coupled to modem 244. In certain embodiment(s), the control unit 150 performs data interaction with, for example, the RS232 port 254, one or more groups of RS485 ports 256, a presence detection/address allocation unit 258, and the SWD interface 260, to obtain monitoring data signal about these components. In certain embodiment(s), real-time monitoring is realized of communication between the main control board and the control unit 150 of the high-bandwidth analog optical module through the RS485 port 256. In certain embodiment(s), the control unit 150 includes: the controller shown in FIG. 2, Flash 250, and indicator light 252.

Regarding the modem 244, it is used, for example, to modulate the monitoring signal output by the control unit 150 to 433/315 MHz to generate a downlink monitoring modulated signal. Then, the downlink monitoring modulation signal is applied to an input end of the photoelectric conversion and transmission unit 120 via the radio frequency switch 246 and the first low-pass filter 248. In certain embodiment(s), the radio frequency switch 246 receives the uplink monitoring modulation signal 270 from the uplink via the second low-pass filter 242. By modulating the monitoring signal output by the control unit 150 to 433/315 MHz, long-distance transmission through optical fiber is made more possible. In certain embodiment(s), the status of each unit such as the IRU unit and NEU unit of the optical fiber distribution system and the status of the modules within the unit are reported to the control unit 150 by broadcasting or polling, to realize network-wide status monitoring and management.

As illustratively shown in FIG. 2, the photoelectric conversion and transmission unit 120 includes, for example, a laser 282, a first optical fiber 284, and an optical splitter 286 (or "optical splitter").

The laser 282 is, for example, configured to modulate the downlink radio frequency signal output by the first high-pass filter 230 of the downlink 110 and the downlink monitoring modulation signal from the first low-pass filter 248 onto the downlink optical signal generated by the laser 282. The first optical fiber 284 is coupled between the laser 282 and the optical splitter 286 and is configured to transmit the downlink optical signal output by the laser 282 to the optical splitter 286.

Regarding the optical splitter 286, it is configured to expand the downlink optical signal transmitted through the first optical fiber 284 into multiple downlink split optical signals. The optical splitter 286 is a passive device in the optical fiber link, which is, for example, an optical fiber tandem device with multiple input ends and multiple output ends. In certain embodiment(s), one downlink optical signal generated by the laser 282 is expanded by the optical splitter 286 into eight downlink split optical signals. The multiple downlink split signals output by the optical splitter 286 are provided to one or more wavelength division multiplexers (not shown in FIG. 2) via one or more second optical fibers 122.

Figure 3:
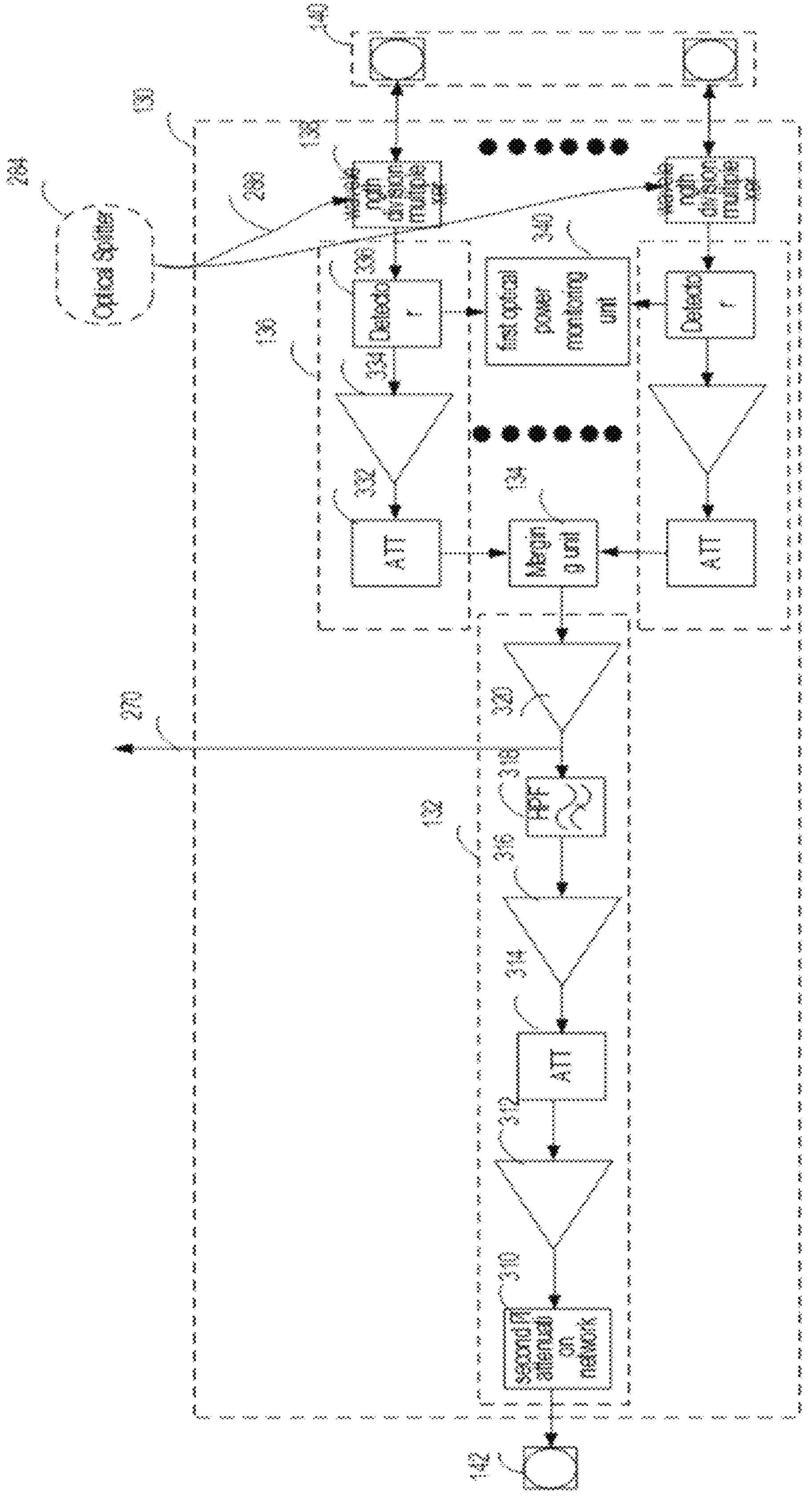
FIG. 3 is a schematic circuit diagram of an uplink according to certain embodiment(s) of the present disclosure.

FIG. 3 illustrates a circuit diagram of an uplink according to certain embodiment(s) of the present disclosure.

As illustratively shown in FIG. 3, the uplink 130 includes: an uplink radio frequency link 132, a merging unit 134, a plurality of uplink branches 136 (for example, but not limited to 8 uplink branches), and a first optical power monitoring unit 340.

Regarding the uplink radio frequency link 132, it includes, for example: a second Π attenuation network 310, a fourth power amplifier 312, a second attenuator 314, a fifth power amplifier 316, a second high-pass filter 318, and a sixth power amplifier 320 coupled in sequence.

Regarding the second Π attenuation network 310, it is configured to be coupled with the radio frequency output port 142 and used to improve the standing wave of the radio frequency output port 142.

The fourth power amplifier 312, the fifth power amplifier 316, and the sixth power amplifier 320 are used to reduce noise floor of the uplink radio frequency link 132, for example, to reduce noise figure and to obtain optimal linear point of the uplink radio frequency link 132. In certain embodiment(s), fifth power amplifier 316 is configured as a backup power amplifier.

Regarding the second attenuator 314, it is coupled between the fourth power amplifier 312 and the fifth power amplifier 316 and is configured to adjust the difference between components. In certain embodiment(s), the second attenuator 314 is configured to obtain gain adjustment that is reserved for differences between components.

Regarding the second high-pass filter 318, it is configured to allow the uplink radio frequency signal from the sixth power amplifier 320 to pass, and to suppress the uplink monitoring modulation signal from passing.

The Uplink branch 136 is configured to be coupled between the wavelength division multiplexer 138 and the merging unit 134. Each uplink branch 136 includes, for example, a detector 336, an amplifier 334, and a first attenuator 332 coupled in sequence.

Regarding the detector 336, it is configured to demodulate the uplink optical signal in the uplink branch 136 into an uplink radio frequency signal and an uplink monitoring modulation signal respectively. In certain embodiment(s), the detector 336 is, for example, a PD detector.

Amplifier 334 is configured to be coupled between detector 336 and first attenuator 332.

In certain embodiment(s), a logarithmic amplifier (not shown in FIG. 3) is configured in the first optical power detection unit for converting the output signal of the detector into an output signal with a predetermined slope. The power-voltage characteristic curve output by the optical power detection circuit of the detector 336 (for example, PD detector light) may be an exponential curve. When the analog-to-digital conversion module (ADC) is directly sampled and tested, a large voltage change may result in the high-power detection interval, which may exceeds the full range of ADC sampling, while the voltage change in the low-power detection interval is small, thus affecting the sampling detection accuracy of the control unit's monitoring software in the low power range. The present disclosure in certain embodiment(s) configures a logarithmic amplifier in the first optical power detection unit, so that a logarithmic amplifier is added after the output of the optical power detection circuit of the detector 336. The power-voltage characteristic curve is converted from an exponential curve into a linear output signal with a fixed slope that is easier for performing data statistics, thereby achieving a larger optical power detection range. The first attenuator 332 is coupled to the detector 336 and is configured to adjust the output signal of the detector 336 so that the power of the output signal of each uplink branch matches. The first attenuator 332 in each uplink branch 136 is controlled by the control unit. The control unit may be the control unit 150 or other control units different from the control unit 150.

Regarding the first optical power monitoring unit 340, it is coupled to the detector 336 of each uplink branch 136, and is configured to detect the optical power value of the uplink optical signal of each uplink branch respectively, that is, to monitor and read the optical power output signal of each detector 336 in real time. The optical power output signal is an analog signal. In certain embodiment(s), the first optical power monitoring unit 340 uses an analog-to-digital conversion module to convert the analog optical power output signal into a digital signal, and then transmits it to the controller (for example, MCU) in the control unit 150.

In certain embodiment(s), the control unit 150 is further configured to compare multiple uplink optical power detection values from the first optical power monitoring unit 340, to generate multiple adjustment signals based on the comparison results; and output the multiple adjustment signals to the first attenuator (s) in at least some of the uplink branches, to adjust the first attenuator in at least some of the uplink branches such that the optical power of the uplink optical signal of each uplink branch matches. Adjusting the optical power of the output signal of each uplink branch 136 to match means, for example, that the optical power of the output signal of each uplink branch 136 is adjusted to be substantially the same as each other.

In certain embodiment(s), a first value matches a second value means that the first value and the second value are within plus or minus 5%, 4%, 3%, 2%, or 1% of each other.

Figure 4:
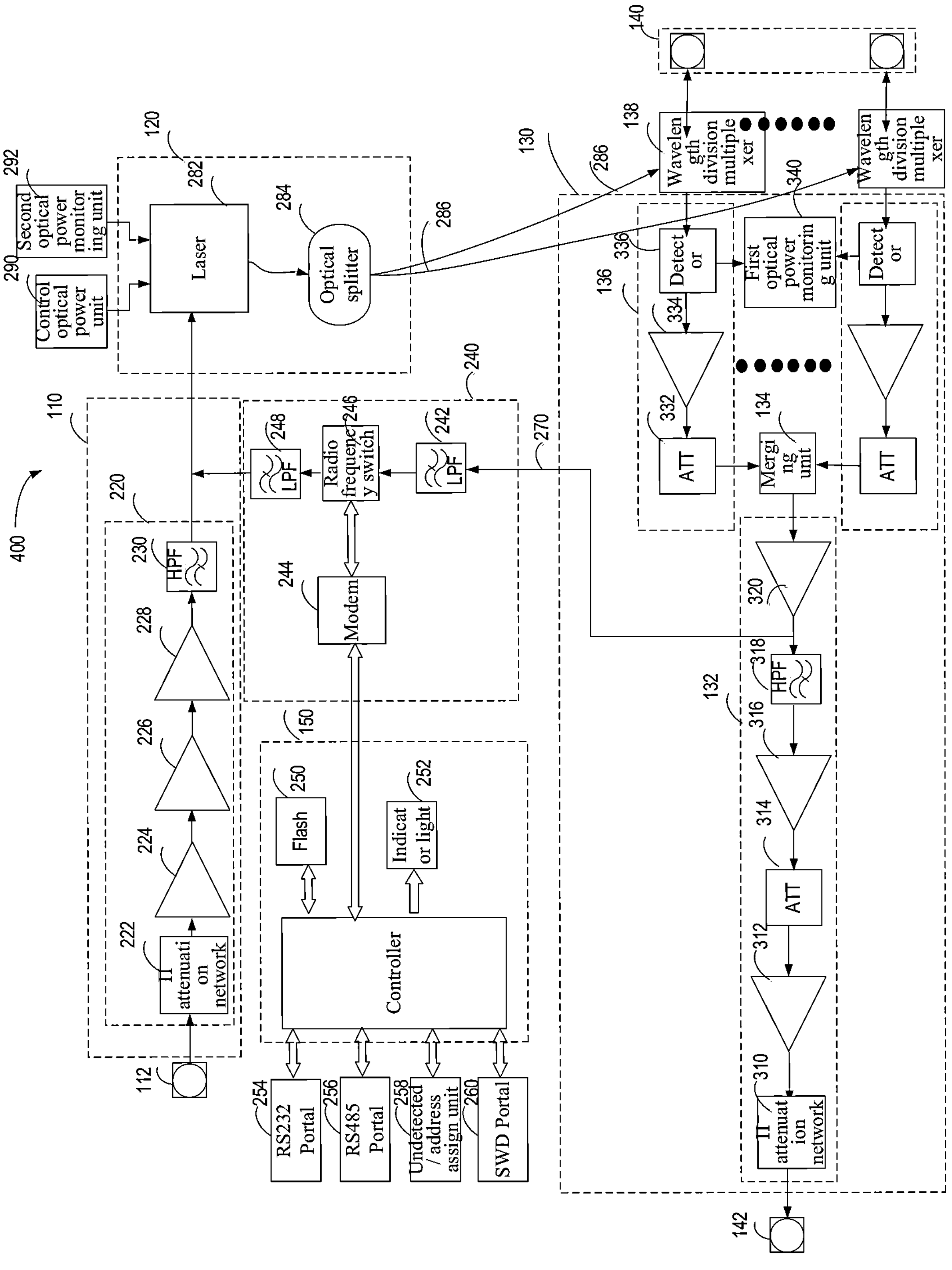
FIG. 4 is a schematic circuit diagram of an optical module according to certain embodiment(s) of the present disclosure.

FIG. 4 illustrates a circuit diagram of a high-bandwidth analog optical module 400 according to certain embodiment(s) of the present disclosure.

The high-bandwidth analog optical module 400 is, for example, a high-bandwidth analog optical module, which supports simultaneous broadband transmission of 2G, 3G, 4G, and 5G multi-network signals. In certain embodiment(s), the uplink radio frequency link 132 and/or the downlink radio frequency link 220 supports the frequency range of 690 MHz~3800 MHz. The photoelectric conversion and transmission unit 120 may achieve a high-bandwidth frequency response.

In certain embodiment(s), the high-bandwidth analog optical module 400 also includes a second optical power monitoring unit 292, which is coupled to the laser 282 and used for real-time monitoring and reading of the optical power output signal of the downlink optical signal generated by the laser 282 (such as, but not limited to, an LD laser). The second optical power monitoring unit 292 uses an analog-to-digital conversion module, for example, to convert the optical power output signal of the analog downlink optical signal into a digital signal, that is, the downlink optical power detection value. The digital signal is communicated to the control unit 150 (for example, MCU).

In certain embodiment(s), the uplink branch 136 includes a first optical power monitoring unit 340. The first optical power monitoring unit 340 is coupled to the detector 336 of each uplink branch 136 for real-time monitoring and reading the optical power output signal of the detector 336 in each uplink branch 136. The first optical power monitoring unit 340, for example, by using the analog-to-digital conversion module, is configured to convert the optical power output signal in each uplink branch 136 into multiple digital signals, that is, multiple uplink optical power detection values. The digital signals are transmitted to control unit 150.

The control unit 150 is configured, for example, to obtain the downlink optical power detection value from the second optical power monitoring unit 292; to obtain a plurality of uplink optical power detection values from the first optical power monitoring unit 340; to compare the plurality of uplink optical power detection values with downlink optical power detection value, to generate a plurality of adjustment signals based on the comparison results; and to output a plurality of adjustment signals to the first attenuator 332 in each uplink branch 136. The first attenuator 332 in each uplink branch 136 is adjusted so that the optical power of the uplink optical signal of each uplink branch matches, and the optical power of the uplink optical signal of each uplink branch matches the optical power of the downlink optical signal. The optical power of the uplink optical signals of each uplink branch is matched means, for example, that the optical power of the uplink optical signals of each uplink branch 136 is adjusted to be substantially the same as each other. The optical power of the uplink optical signal of each uplink branch matches the optical power of the downlink optical signal means, for example, the difference between the adjusted optical power of the uplink optical signal of each uplink branch 136 and the output power of the downlink optical signal is less than or equal to a predetermined error threshold. The error threshold is, for example, an error range of ±1 dB.

In certain embodiment(s), the control unit 150 may also compare an uplink optical power detection value with a downlink optical power detection value, to generate an adjustment signal for adjusting a first attenuator in an uplink branch 136 based on the comparison result, to adjust the adjustment signal of the optical power unit 290, and to adjust the first attenuator 332 in each uplink branch 136 so that the optical power of the uplink optical signal of each uplink branch matches, and the optical power of the uplink optical signal of the uplink branch matches the optical power of the downlink optical signal.

Certain existing laser installation method may bend the four pins at 90 degrees in one direction, so that the longest pin exceeds 5 mm. Because the pin is too long, "the problem of discontinuous transmission impedance at higher frequencies" may result, which in turn causes the high-frequency performance in the full bandwidth range of 690 MHz~3800 MHz to deteriorate. To reduce the problem of high frequency performance degradation caused by long laser pins, the laser 282 (for example, but not limited to, an LD laser) is configured such that the length of each of the plurality of pins of the laser is less than or equal to a predetermined length threshold, and the plurality of pins of the laser are soldered to the front and back sides of the printed circuit board (PCB) through patch pad respectively, that is, it is installed by welding some (for example, two) pins of the laser 282 through patch pads on the front and back sides of the printed circuit board (PCB). Therefore, the present disclosure in certain embodiment(s) effectuates a reduction in the impact of the transmission impedance discontinuity problem, thereby improving high-frequency performance indicators and improving full-bandwidth performance.

In certain embodiment(s), the laser 282 is configured such that the positive electrode of the power supply pin of the laser is connected to ground and the negative electrode of the power supply pin is connected to a negative voltage. For example, the laser 282 is configured such that the positive electrode of the power supply pin is connected to ground and the negative electrode is connected to −5V. Therefore, the outer shell of the LD laser may be directly mounted to the chassis of the module. The shell of certain existing laser may be connected to the positive pole of the power supply. For example, the positive electrode of the power supply pin of the LD laser is connected to +5V and the negative electrode is connected to ground. This may cause the shell of the LD laser of certain existing laser to be connected to the ground only through the capacitor to realize radio frequency grounding via bypassing. But due to the distribution parameter characteristics of the actual capacitor at high frequencies, the grounding performance in certain existing laser may become unsatisfactory in the full broadband 690 MHz~3800 MHz frequency range, thus affecting the flatness index of the full bandwidth of the optical module. By configuring the laser 282 to use negative voltage power supply, the present disclosure in certain embodiment(s) realizes that the shell of the laser be directly installed and crimped with the chassis of the module, achieving a satisfactory grounding performance and further improving the high-bandwidth flatness index performance of the laser.

Figure 5:
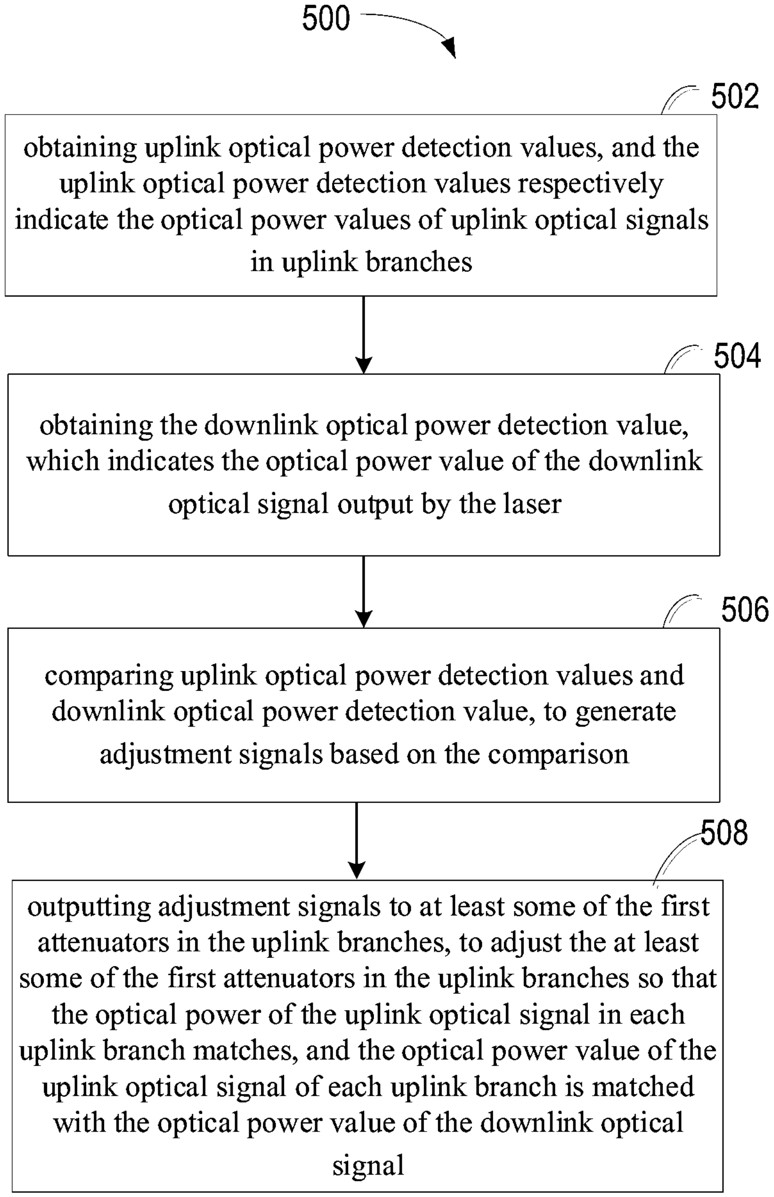
FIG. 5 is a schematic flowchart of a method for aligning the optical power of an uplink optical signal and a downlink optical signal according to certain embodiment(s) of the present disclosure.

FIG. 5 illustrates a flowchart of a method 500 for matching the optical power of an uplink optical signal and a downlink optical signal according to certain embodiment(s) of the present disclosure. The method 500 may be performed by the control unit 150 as shown in FIG. 1, the method 500 may include additional blocks not shown and/or the blocks shown may be omitted, and the scope of the present disclosure is not limited in this respect.

At step 502, the control unit 150 obtains a plurality of uplink optical power detection values, and the plurality of uplink optical power detection values respectively indicate the optical power values of uplink optical signals in multiple uplink branches. For example, the control unit 150 acquires multiple uplink optical power detection values from the first optical power monitoring unit 340.

At step 504, the control unit 150 obtains the downlink optical power detection value, which indicates the optical power value of the downlink optical signal output by the laser. For example, the control unit 150 obtains the downlink optical power detection value from the second optical power monitoring unit 292.

At step 506, the control unit 150 compares multiple uplink optical power detection values and downlink optical power detection values, to generate multiple adjustment signals based on the comparison results.

At step 508, the control unit 150 outputs a plurality of adjustment signals to at least some of the first attenuators in the uplink branches, to adjust the at least some of the first attenuators in the uplink branches so that the optical power of the uplink optical signal in each uplink branch matches, and the optical power value of the uplink optical signal of each uplink branch is matched with the optical power value of the downlink optical signal.

The present disclosure in certain embodiment(s) detects the optical power value of uplink optical signals received by multiple channels in real time, and independently compensates for the loss of each optical link. The present disclosure in certain embodiment(s) targets different fiber losses in each channel of the distribution system despite the long distance, where adaptive compensation is performed, so that the output signal amplitude of each optical link remains balanced.

Figure 6:
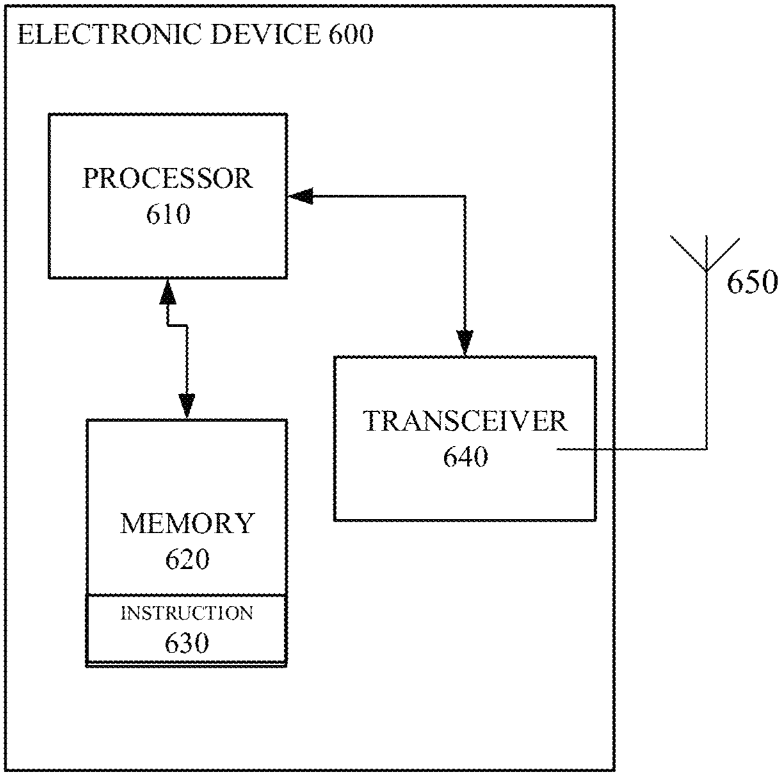
FIG. 6 is a schematic block diagram of an electronic device used to implement certain embodiment(s) of the present disclosure.

FIG. 6 illustrates a schematic block diagram of an example electronic device 600 that may be used to implement certain embodiment(s) of the present disclosure. Electronic device 600 may be used to implement control unit 150 as shown in FIG. 1. As illustratively shown in FIG. 6, electronic device 600 includes processor 610. Processor 610 controls the operation and functionality of electronic device 600. For example, in certain embodiment(s), processor 610 may perform various operations via instructions 630 stored in memory 620 coupled thereto. Memory 620 may be of any suitable type suitable for the technology environment and may be implemented using any suitable data storage technology, including but not limited to semiconductor-based storage devices, magnetic storage devices and systems, optical storage devices and systems. Although only one memory 620 is shown in FIG. 6, the electronic device 600 may include more physically different memories 620.

Processor 610 may be of any suitable type appropriate to the local technology environment and may include, but is not limited to, a general purpose computers, a special purpose computer, a microprocessor, a digital signal processor (DSP), and one or more processor-based multi-core processor architectures. Electronic device 600 may also include multiple processors 610. The processor 610 is coupled to a transceiver 640, which may receive and transmit information via one or more antennas 650 and/or other components.

The present disclosure may be implemented as a method, an apparatus, a system and/or a computer program product. The computer program product may include a computer-readable storage medium having computer-readable program instructions thereon for performing various aspects of the present disclosure.

In one or more exemplary designs, the functions of the present disclosure may be implemented in hardware, software, firmware, or any combination thereof. For example, if implemented in software, the functions may be stored on or transmitted over as one or more instructions or code on a computer-readable medium.

Each unit of the device disclosed herein may be implemented using discrete hardware components, or may be integrated and implemented on a hardware component, such as a processor. For example, a general purpose processor, a digital signal processor (DSP), an application specific integrated circuit (ASIC), a field programmable gate array (FPGA) or other programmable logic device, a discrete gate or a transistor logic, a discrete hardware component, or any combination of the functionality herein may be performed to implement or perform the various illustrative logical blocks, modules, and circuits described in connection with the present disclosure.

Moreover, various illustrative logical blocks, modules, circuits, and algorithm steps described in connection with the embodiment(s) of the present disclosure may be implemented as electronic hardware, computer software, or combinations of both.

The above description of the present disclosure is provided to assist in making or using certain embodiment(s) of the present disclosure. Various modifications to the present disclosure are available, and the general principles defined herein may be applied to other variations without departing from the spirit and scope of the present disclosure. Thus, the present disclosure is not intended to be limited to the examples and designs herein but is to be accorded the widest scope consistent with the principles and novel features disclosed herein.

What is claimed is:

1. An optical module, comprising:

one or more optical ports, each configured to receive an uplink optical signal or transmit a downlink optical signal;

a downlink, configured to convert a radio frequency input signal to a downlink radio frequency signal, and apply the downlink radio frequency signal to a photoelectric conversion and transmission unit;

a control unit, configured to generate a downlink monitoring modulation signal applied to the photoelectric conversion and transmission unit;

the photoelectric conversion and transmission unit, configured to modulate the downlink radio frequency signal and the downlink monitoring modulation signal onto a downlink optical signal, comprising:

a laser, configured to generate the downlink optical signal;

a first optical fiber, configured to transmit the downlink optical signal to an optical splitter, the first optical fiber is coupled between the laser and the optical splitter;

the optical splitter, configured to expand the downlink optical signal into multiple downlink split optical signals; and one or more second optical fibers, configured to transmit the multiple downlink split optical signals to the one or more optical ports, one end of each second optical fiber in the one or more second optical fibers is coupled to the optical splitter;

an uplink, configured to convert an uplink optical signal into a radio frequency output signal; and a frequency shift keying unit configured between the control unit and the photoelectric conversion and transmission unit, comprising:

a modem, configured to modulate the downlink monitoring modulation signal;

a first low-pass filter, coupled to an input end of the photoelectric conversion and transmission unit, configured to allow the downlink monitoring modulation signal applied to the photoelectric conversion and transmission unit to pass, and to suppress passage of the downlink radio frequency signal;

a radio frequency switch connected to the modem, coupled between the first low-pass filter and a second low-pass filter, and configured to switch between transmission and reception of the downlink monitoring modulation signal; and the second low-pass filter, configured to allow that an uplink monitoring modulation signal of an uplink radio frequency link be provided to the radio frequency switch, and to suppress passage of an uplink radio frequency signal of the uplink radio frequency link, wherein an output end of the first low-pass filter is connected to an input end of the laser of the photoelectric conversion and transmission unit, and the downlink monitoring modulation signal sequentially passes through the radio frequency switch and the first low-pass filter to reach the input end of the laser for modulating the downlink optical signal that is expanded by the optical splitter.

2. The optical module according to claim 1, further comprising:

one or more wavelength division multiplexers, coupled to the one or more optical ports via one or more third optical fibers, the other end of each second optical fiber being coupled to a corresponding multiplexer in the one or more wavelength division multiplexers; and one or more third optical fibers, coupled between the one or more wavelength division multiplexers and the one or more optical ports.

3. The optical module according to claim 1, wherein the uplink includes a plurality of uplink branches, and each of the plurality of uplink branches comprises:

a detector, configured to demodulate the uplink optical signal in the uplink branch into the uplink radio frequency signal and the uplink monitoring modulation signal respectively; and a first attenuator, coupled to the detector and configured to adjust an output signal of the detector.

4. The optical module according to claim 3, further comprising:

a first optical power detection unit, coupled to the detector of each uplink branch, and configured to detect an optical power value of the uplink optical signal of each uplink branch respectively, wherein, the control unit is further configured to receive the detection signal of the first optical power detection unit, to respectively adjust the first attenuator in the corresponding uplink branch based on the detection signal of the first optical power detection unit, and the detection signal of the first optical power detection unit indicates an optical power value of the uplink optical signal of an uplink branch.

5. The optical module according to claim 4, wherein the first optical power detection unit further comprises:

a logarithmic amplifier, to convert an output signal of a photodetector into an output signal with a predetermined slope.

6. The optical module according to claim 1, wherein the uplink further comprises:

a merging unit, coupled between multiple uplink branches and the uplink radio frequency link, for merging multiple radio frequency signals converted through multiple uplink optical signals into the one uplink radio frequency signal;

the uplink radio frequency link, configured to convert the uplink radio frequency signal into the radio frequency output signal.

7. The optical module according to claim 4, wherein the downlink comprises:

a downlink radio frequency link, configured to convert the radio frequency input signal into the downlink radio frequency signal applied to the photoelectric conversion and transmission unit, the downlink radio frequency link at least includes:

a first high-pass filter, configured to allow the downlink radio frequency signal to pass and to suppress passage of the downlink monitoring modulation signal.

8. The optical module according to claim 1, wherein the laser is configured such that a length of a pin of the laser is less than or equal to a predetermined length threshold, and the pin of the laser is soldered to front and back sides of a printed circuit board.

9. The optical module according to claim 1, wherein the laser is configured such that a positive electrode of a power supply pin of the laser is connected to the ground, and a negative electrode of the power supply pin is connected to a negative voltage.

10. The optical module according to claim 1, wherein the downlink and the uplink support a frequency range of 690 MHz to 3800 MHz, and the downlink monitoring modulation signal is modulated to 433/315 MHz.

11. The optical module according to claim 4, wherein the control unit is configured to:

obtain uplink optical power detection values, the uplink optical power detection values respectively indicating optical power values of uplink optical signals in the uplink branches;

obtain a downlink optical power detection value, the downlink optical power detection value indicating an optical power value of the downlink optical signal output by the laser;

compare the uplink optical power detection values and the downlink optical power detection value, to generate an adjustment signal based on a comparison result; and to output the adjustment signal to one of the first attenuators.

* * * * *